March 13, 1951     W. P. ZEIGLER     2,545,129
ARTIFICIAL FISH BAIT
Filed July 3, 1946
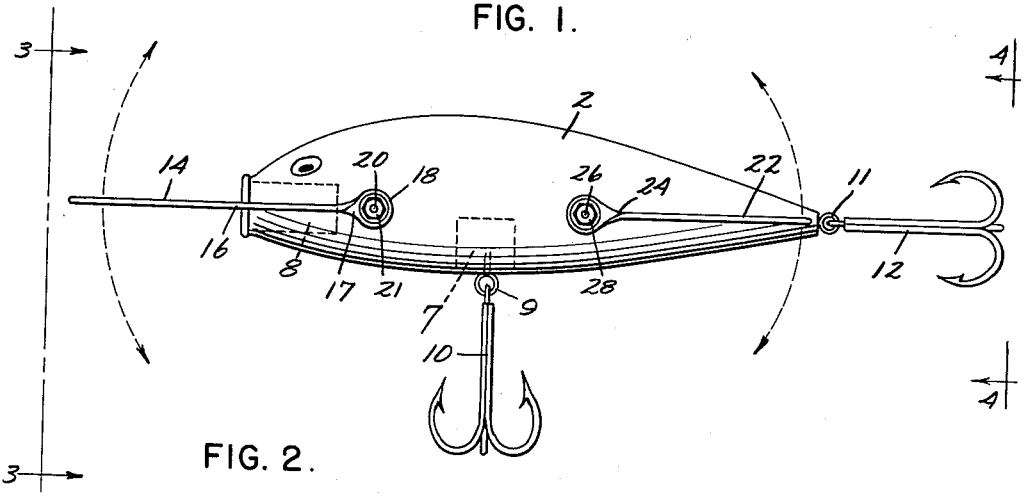
FIG. 1.
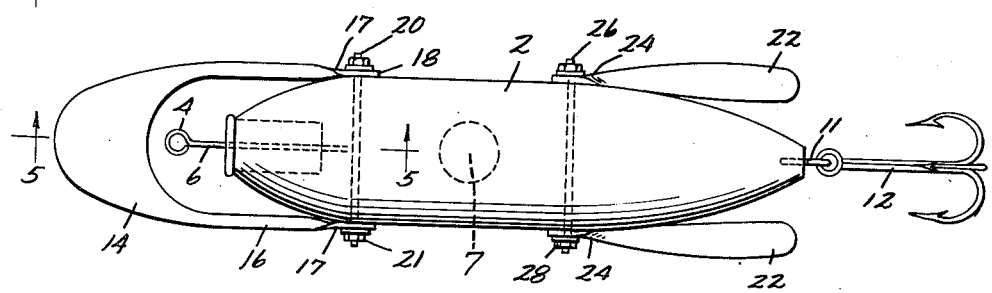
FIG. 2.
FIG. 5.
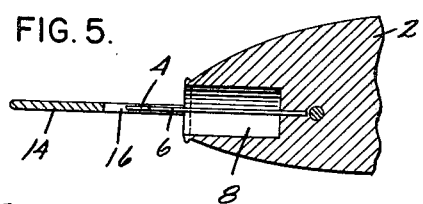
FIG. 3.     FIG. 4.
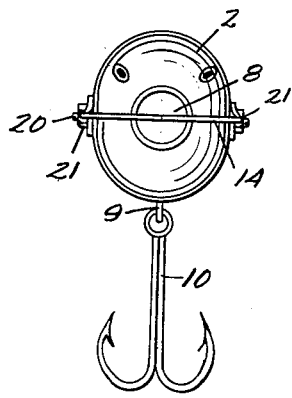
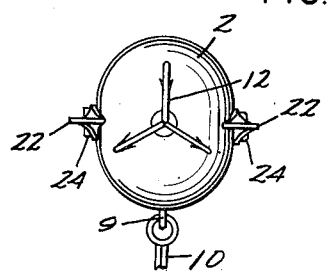
INVENTOR.
William Perry Zeigler,
BY Victor J. Evans & Co.
ATTORNEYS Patented Mar. 13, 1951

2,545,129

UNITED STATES PATENT OFFICE 2,545,129

ARTIFICIAL FISH BAIT

William Perry Zeigler, Fairoaks, Pa.

Application July 3, 1946, Serial No. 681,372

1 Claim. (Cl. 43—42.22)

My present invention relates to an improved fishing plug and more particularly to the control means employed therewith to direct the movement of the plug when moved through the water.

According to my invention stabilizing planes are provided for the plug both forward and rearward and vertically adjustable in order that the movement of the plug may be predetermined for travel on the surface of the water, or below the surface.

In the accompanying drawings I have illustrated one complete example of the physical embodiment of my invention according to the best mode I have thus far devised but it will be understood that various changes and alterations may be made in the exemplified structure within the scope of the appended claim.

In the drawings:

Figure 1 is a side elevational view of the plug of my invention.

Figure 2 is a top plan view thereof.

Figure 3 is a front elevational view.

Figure 4 is a rear elevational view; and

Figure 5 is a vertical sectional view taken at line 5—5 of Figure 2.

Referring now to the drawings wherein like characters indicate like parts, I have illustrated a fishing plug 2 of elongated shape and simulating in appearance a minnow or other small fish. A line attaching ring 4 extends forwardly from the body, and the rod 6 passes through the countersink 8 and is affixed to the body 2.

A hook attaching eye 9 is located on the under side of the body for attachment of the hook 10, while a rear eye 11 receives and retains the rear hook 12. A weight 7 is arranged in the body.

Adapted to extend forwardly of the body I provide an elevator 14 of thin flat metal or other suitable material, and the arms 16 extend rearwardly to the body of the plug. These arms in the same horizontal plane as the elevator, are bent or twisted as at 17 so that the ends of the arms extend in a vertical plane for pivotal attachment at 18 to the transverse shaft 20 and are secured thereon by nuts 21.

A pair of rear stabilizers 22 extend horizontally from the rear of the plug and these stabilizers are twisted at 24 so that the forward attaching ends of the stabilizers are in a vertical plane. The ends of the stabilizers are secured on the transverse shaft 26 by means of nuts 28.

When the plug above described is to be used and before it is placed in the water, the fisherman determines whether the fish will rise to a surface traveling bait, or a submerged bait.

If the plug is to travel on the surface of the water when trolled or otherwise drawn through the water, the elevator and the stabilizer will be raised above the median line of the plug and at an angle thereto. This position of the stabilizers and elevator will cause the plug to travel along the surface of the water.

If submerged travel is desired the elevator and stabilizers are moved downward so that the elements are disposed angularly from the median line of the plug to move the plug in a submerged path.

The movement of the elevator and stabilizer need not, of course, be identical, and the stabilizers can be raised while the elevator is lowered, or vice versa, with different results.

The plug according to my invention is efficient and highly satisfactory in operation and being simple to use and manufacture presents an advance in the art.

Having thus fully described my invention what I claim as new and desire to secure by Letters Patent is:

A fishing plug comprising a body having the configuration of a fish, said body having a countersunk portion in the front end thereof, a line attaching ring extending into said countersunk portion and secured to said body, an elevator including an intermediate portion positioned forwardly of said line attaching ring, and a pair of arms extending rearwardly from the intermediate portion of said elevator and lying in the same plane as the latter, said arms being positioned on opposite sides of said line attaching ring, a first shaft extending transversely through said body adjacent the front end thereof, the rear ends of said arms being bent at right angles to the main portions of said arms and pivotally connected to said first shaft, a second transverse shaft extending through the rear portion of said body and arranged in spaced parallel relation with respect to said first shaft, a pair of rear stabilizers mounted on opposite sides of said body, said stabilizers each having their front end bent at right angles with respect to the major portion of said stabilizer, the front ends of said stabilizers being pivotally connected to said second shaft, and a plurality of hooks secured to said body.

WILLIAM PERRY ZEIGLER.

REFERENCES CITED

The following references are of record in the file of this patent:

UNITED STATES PATENTS

| Number | Name | Date |
|---|---|---|
| 956,872 | Alger | May 3, 1910 |
| 1,202,631 | Winnie | Oct. 24, 1916 |
| 1,232,211 | Burkman | July 3, 1917 |
| 1,297,617 | Welles | Mar. 18, 1919 |
| 1,458,844 | Perkins | June 12, 1923 |
| 1,542,404 | Paulson | June 16, 1925 |
| 2,112,901 | Anderson | Apr. 5, 1938 |
| 2,243,663 | Wareham | May 27, 1941 |
| 2,472,639 | Wickens | June 7, 1949 |

FOREIGN PATENTS

| Number | Country | Date |
|---|---|---|
| 128,073 | Great Britain | June 19, 1919 |